United States Patent [19]

Schmidt

[11] Patent Number: 5,415,670
[45] Date of Patent: May 16, 1995

[54] APPARATUS FOR DEBURRING A CARTRIDGE INSIDE AND OUTSIDE

[76] Inventor: Delbert L. Schmidt, P.O. Box 598, Craig, Colo. 81626

[21] Appl. No.: 181,005

[22] Filed: Jan. 14, 1994

[51] Int. Cl.⁶ .............................................. B23P 15/22
[52] U.S. Cl. ..................................... 29/1.32; 408/117; 409/140; 409/228
[58] Field of Search ................. 409/228, 64, 226, 145, 409/138, 140; 29/1.3, 1.31, 1.32; 86/24, 23, 28, 33; 30/287; 408/211

[56] References Cited

U.S. PATENT DOCUMENTS 5,050,475  9/1991  Kolmer .............................. 29/1.3 X

*Primary Examiner*—William Briggs

[57] ABSTRACT

An apparatus for deburring a cartridge inside and outside comprising a base plate having an upper surface and a lower surface adapted to be positioned on a work surface, an upstanding interior housing secured to the upper surface of the base plate interiorly at its edges to define therewithin a chamber, a motor located within the interior chamber with a power generating drive shaft extending therefrom to within the exterior chamber for rotation upon energization of the motor, a driven gear rotatable on a horizontal axis having external drive teeth on the periphery thereof, a pair of driven shafts mounted about parallel, horizontal axis above the motor and drive shaft and rotatably secured adjacent to their ends to the interior housing, a driven gear mounted on each driven shaft at a common elevation within the exterior housing above the motor and power shaft at laterally spaced locations, each driven gear being in driving engagement with the drive gear for counter rotating with respect to each other and a pair of supplemental shafts rotatable through the rotation of the driven gears and driven shafts for rotation upon the energization of the motor, the supplemental shafts having free ends adjacent to apertures in the exterior housing and providing external surfaces for receipt of bits.

1 Claim, 3 Drawing Sheets

FIG. 5
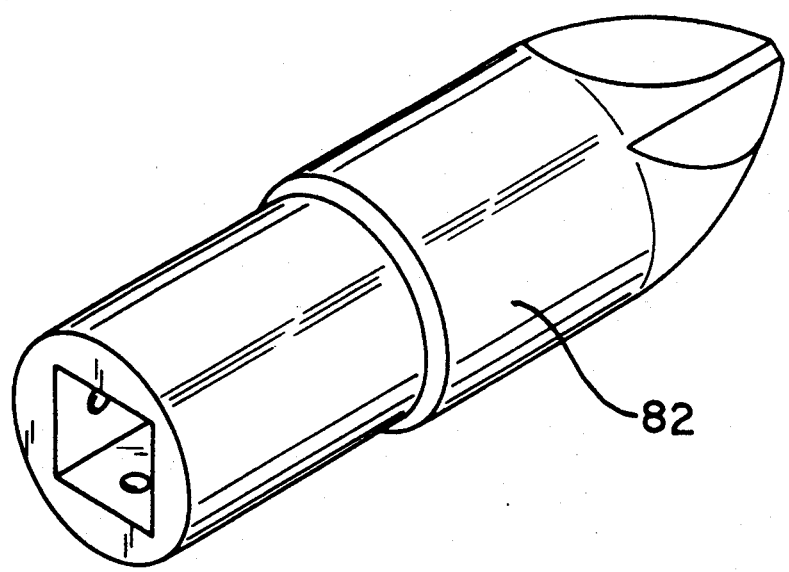
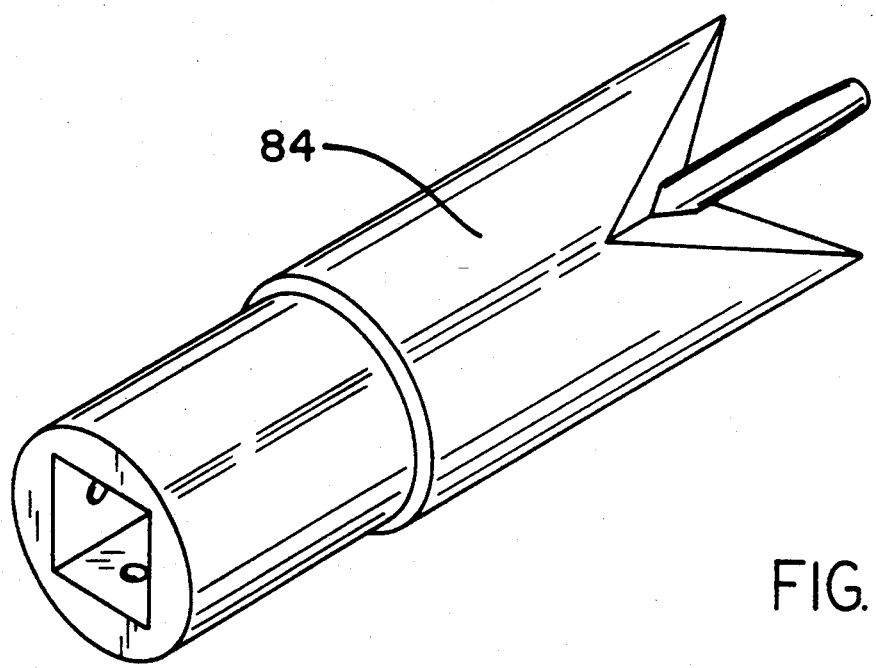
FIG. 6

APPARATUS FOR DEBURRING A CARTRIDGE INSIDE AND OUTSIDE

BACKGROUND OF THE INVENTION

1. Field of the Invention

The present invention relates to apparatus for deburring a cartridge inside and outside and more particularly pertains to removing the inside and outside burrs of a rifle or pistol cartridge after it has been trimmed to the proper length.

2. Description of the Prior Art

The use of deburring tools is known in the prior art. More specifically, deburring tools heretofore devised and utilized for the purpose of for removing unnecessary materials from a workpiece are known to consist basically of familiar, expected, and obvious structural configurations, notwithstanding the myriad of designs encompassed by the crowded prior art which has been developed for the fulfillment of countless objectives and requirements.

By way of example, the prior art discloses in U.S. Pat. No. 4,468,829 a tool for cleaning and deburring spent cartridge cases by means of a cleaner at a first end of the tool used to clean the primer pocket of carbon and other residue remaining in the pocket is disclosed herein.

U.S. Pat. No. 4,653,157 discloses a cartridge trimming apparatus of the mini-lathe variety.

U.S. Pat. No. 4,813,827 discloses a battery operated, portable hand controlled cartridge case trimmer which indexes on the entire length of the case and permits resizing based on the total explosive expansion of the cartridge.

U.S. Pat. No. 4,860,453 discloses a deburring tool is provided having two sets of blades for use in simultaneously deburring the inner and outer edges of a piece of tubing, further including adjustment capability allowing the use of the tool in deburring tubing of different sizes, further including a cap recess cleaning tool, a cleaning brush and a base for mounting the deburring tool on a bench, table or the like.

U.S. Pat. No. 5,050,475 discloses an apparatus to recondition used ammunition cartridge cases in order that they can be reloaded and reused.

U.S. Pat. No. Des. 306,123 discloses an ornamental design for a trimming and deburring tool for gun cartridge cases.

In this respect, the apparatus for deburring a cartridge inside and outside according to the present invention substantially departs from the conventional concepts and designs of the prior art, and in doing so provides an apparatus primarily developed for the purpose of remove the inside and outside burrs of a rifle or pistol cartridge after it has been trimmed to the proper length.

Therefore, it can be appreciated that there exists a continuing need for a new and improved apparatus for deburring a cartridge inside and outside which can be used for remove the inside and outside burrs of a rifle or pistol cartridge after it has been trimmed to the proper length. In this regard, the present invention substantially fulfills this need.

SUMMARY OF THE INVENTION

In view of the foregoing disadvantages inherent in the known types of deburring tools now present in the prior art, the present invention provides an improved apparatus for deburring a cartridge inside and outside. As such, the general purpose of the present invention, which will be described subsequently in greater detail, is to provide a new and improved apparatus for deburring a cartridge inside and outside which has all the advantages of the prior art and none of the disadvantages.

To attain this, the present invention essentially comprises a new and improved apparatus for deburring a cartridge inside and outside comprising, in combination, a base plate having an upper surface and a lower surface adapted to be positioned on a work surface, an upstanding interior housing secured to the upper surface of the base plate interiorly at its edges to define therewithin a chamber, an upstanding exterior housing secured to the upper surface of the base plate adjacent to its edges with the interior housing therewithin, a motor located within the interior chamber with a power generating drive shaft extending therefrom to within the exterior chamber for rotation upon energization of the motor, a driven gear rotatable on a horizontal axis having external drive teeth on the periphery thereof, a pair of driven shafts mounted about parallel, horizontal axis above the motor and drive shaft and rotatably secured adjacent to their ends to the interior housing, a driven gear mounted on each driven shaft at a common elevation within the exterior housing above the motor and power shaft at laterally spaced locations, each driven gear being in driving engagement with the drive gear for counter rotating with respect to each other, a pair of supplemental shafts rotatable through the rotation of the driven gears and driven shafts for rotation upon energization of the motor, the supplemental shafts having free ends adjacent to apertures in the exterior housing and providing external surfaces for receipt of bits and an inside deburring bit removably mounted on the supplemental shaft and an outside deburring bit removably mounted on the other supplemental shaft for rotation for deburring the inside and outside of cartridges.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide new and improved apparatus for deburring a cartridge inside and outside which have all the advantages of the prior art deburring tools and none of the disadvantages.

It is another object of the present invention to provide new and improved apparatus for deburring a cartridge inside and outside which may be easily and efficiently manufactured and marketed.

It is further object of the present invention to provide new and improved apparatus for deburring a cartridge inside and outside which are of durable and reliable constructions.

An even further object of the present invention is to provide new and improved apparatus for deburring a cartridge inside and outside which are susceptible of a low cost of manufacture with regard to both materials and labor, and which accordingly are then susceptible of low prices of sale to the consuming public, thereby making such apparatus for deburring a cartridge inside and outside economically available to the buying public.

Still yet another object of the present invention is to provide new and improved apparatus for deburring a cartridge inside and outside which provide in the apparatuses and methods of the prior art some of the advantages thereof, while simultaneously overcoming some of the disadvantages normally associated therewith.

Still another object of the present invention is to remove the inside and outside burrs of a rifle or pistol cartridge after it has been trimmed to the proper length.

Lastly, it is an object of the present invention to provide apparatus for deburring a cartridge inside and outside comprising a base plate having an upper surface and a lower surface adapted to be positioned on a work surface, an upstanding interior housing secured to the upper surface of the base plate interiorly at its edges to define therewithin a chamber, a motor located within the interior chamber with a power generating drive shaft extending therefrom to within the exterior chamber for rotation upon energization of the motor, a driven gear rotatable on a horizontal axis having external drive teeth on the periphery thereof, a pair of driven shafts mounted about parallel, horizontal axis above the motor and drive shaft and rotatably secured adjacent to their ends to the interior housing, a driven gear mounted on each driven shaft at a common elevation within the exterior housing above the motor and power shaft at laterally spaced locations, each driven gear being in driving engagement with the drive gear for counter rotating with respect to each other and a pair of supplemental shafts rotatable through the rotation of the driven gears and driven shafts for rotation upon the energization of the motor, the supplemental shafts having free ends adjacent to apertures in the exterior housing and providing external surfaces for receipt of bits.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a perspective view of one of the bits used in association with the device shown in FIG. 1.

FIG. 6 is a perspective view of another bit shown in FIGS. 1, 2 and 4.

The same reference numerals refer to the same parts through the various Figures.

DESCRIPTION OF THE PREFERRED EMBODIMENT

Figure 1:
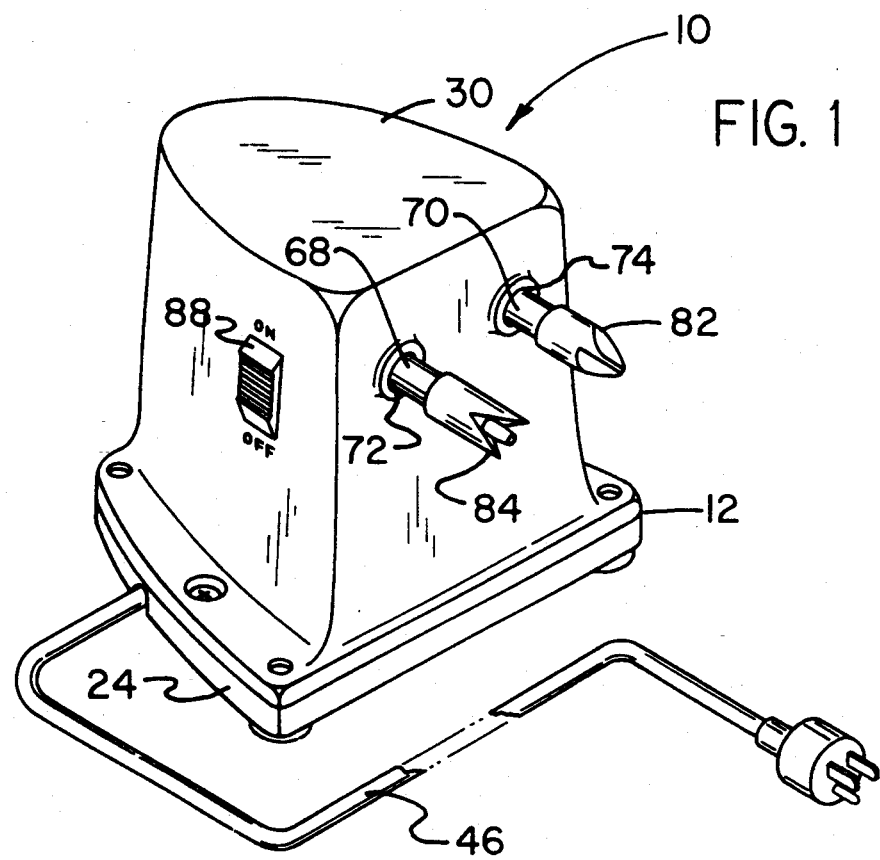
FIG. 1 is a perspective view of the preferred embodiment of the apparatus for the new and improved deburring of a cartridge inside and outside constructed in accordance with the principles of the present invention.
Figure 2:
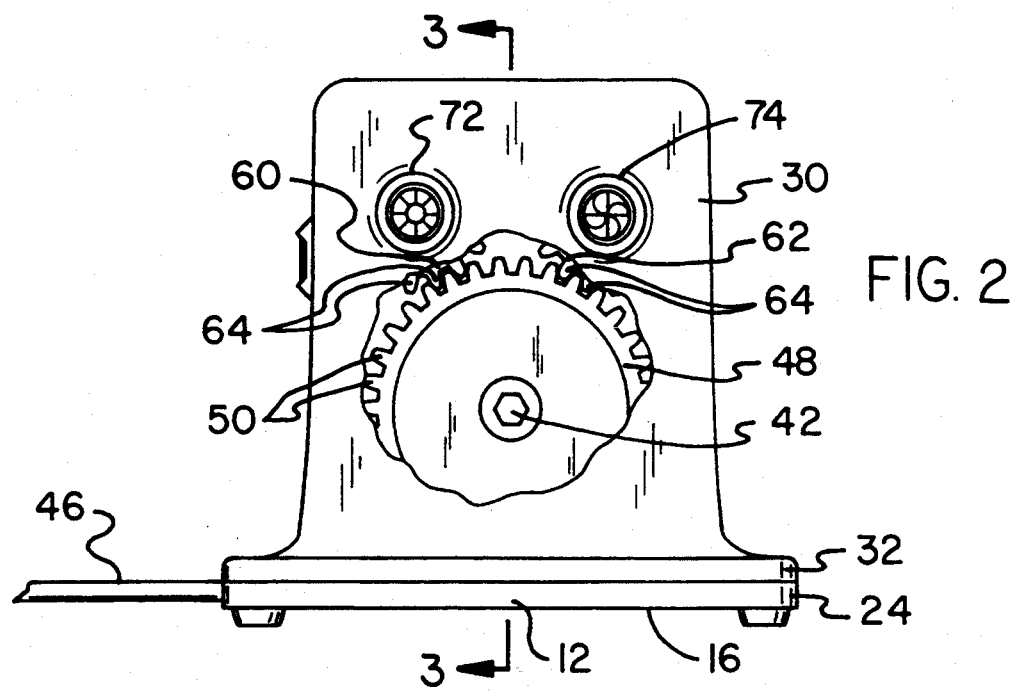
FIG. 2 is a side elevational view of the device shown in FIG. 1 with parts removed to show certain internal constructions.
Figure 3:
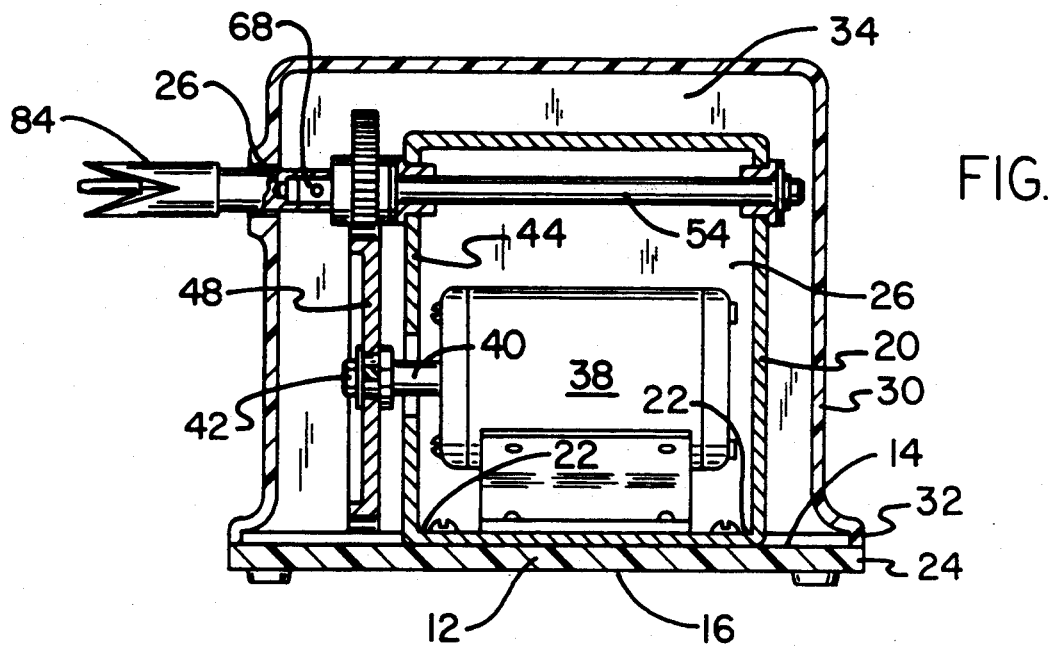
FIG. 3 is a cross-sectional view taken along lines 3—3 of FIG. 2.
Figure 4:
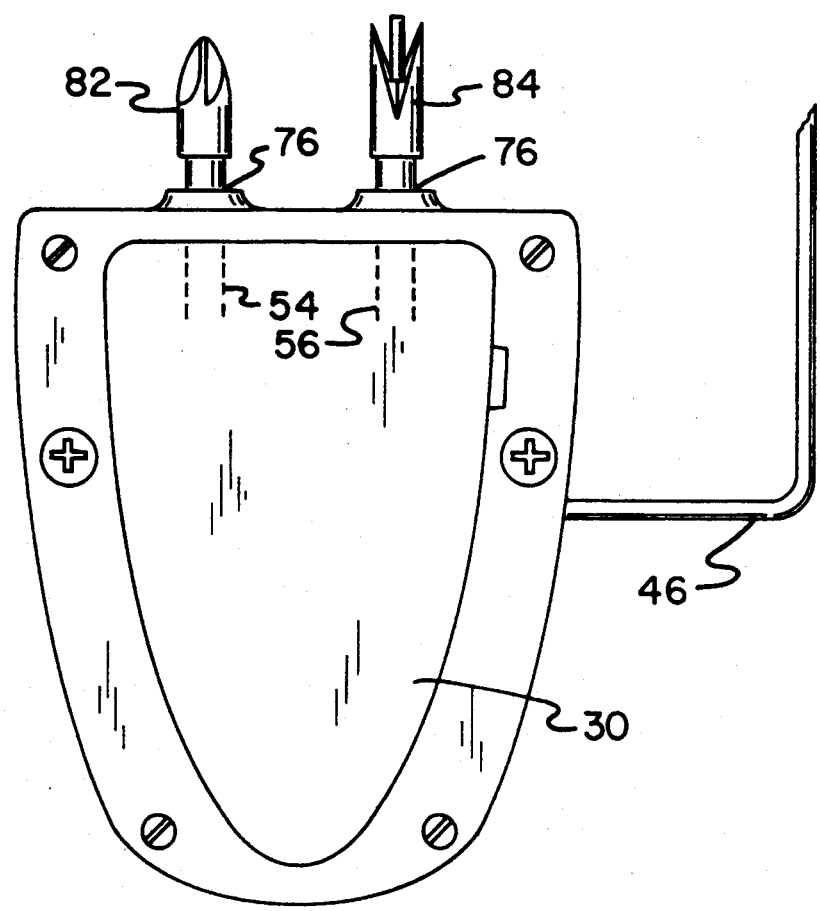
FIG. 4 is a top plan view of the device shown in FIGS. 1, 2 and 3.

With reference now to the drawings, and in particular to FIG. 1 thereof, the preferred embodiment of the new and improved apparatus for deburring a cartridge inside and outside embodying the principles and concepts of the present invention and generally designated by the reference numeral 10 will be described.

Specifically, the present invention, the new and improved apparatus for deburring a cartridge inside and outside is in system 10. Such system, in its simplest terms, includes a plurality of parts including a base plate, an interior housing, an exterior housing, a motor, a drive gear, a pair of driven shafts, a driven gear, a pair of supplemental shafts and an inside and an outside deburring tool. Each of these component parts are configured individually and are cooperatively associated to attain the desired objective.

More specifically, the base plate 12 is a rigid member. It is in a planar configuration with an upper surface 14 and a lower surface 16. The base plate 12 is adapted to be positioned on a work plate and support on its upper surface the operative components of the device 10.

The next major component of the system 10 is an upstanding interior housing 20. The interior housing 20 is secured as through bolts secured to the upper surface of the base plate 12. The housing 20 has lower edges 22 which are located spaced laterally interior of the peripheral edges 24 of the base plate 12. Within the interior housing 20 there is thereby defined an interior chamber 26.

An upstanding exterior housing 30. The exterior housing 30, like the interior housing 20, is secured to the upper surface of the base plate 12. The lower edges 32 of the exterior housing 30 are located adjacent to the peripheral edges of the base plate 12. The exterior housing 30 is located and sized whereby the interior housing 20 is totally within the exterior housing 30. Located between the interior and exterior housing is an exterior chamber 34.

Power is provided to the system 10 of the present invention through a motor 38. The motor 38 is located totally within the interior chamber 26. Extending from one end of the motor 38 is a power-generating drive shaft 40. The drive shaft 40 extends from the motor 38. The exterior end 42 of the drive shaft extends through the adjacent wall 44 of the interior chamber 26 to a location within the exterior chamber 34. The drive shaft 40 is adapted to rotate about a horizontal axis upon the energization of the motor. An electrical cord 46 is adapted to couple the motor with a source of potential such as a wall outlet. It should be understood, however, that batteries could be used for powering the motor 38.

Located adjacent to the free end of the drive shaft 40 is a drive gear 48. The drive gear 48 is rotatable on a horizontal axis coextensive with the axis of the drive shaft 40 upon which it is supported. The drive gear 48 has external drive teeth 50 on its periphery.

Next provided as component elements of the system 10 are a pair of driven shafts 54 and 56. The driven shafts 54 and 56 are mounted on parallel horizontal axes laterally based at a common elevation from the base plate 12. Such driven shafts 54 and 56 and axes are located above the motor 38 and driven shaft and drive gear 48. The driven shafts are secured adjacent to their ends on bearing surfaces located in the interior housing 20.

Located on the free end of the each of the driven shafts is a driven gear 60 and 62. The driven gears are mounted on the driven shafts at a common elevation within the exterior housing 30. They are of equal size with similar configurations for their teeth 64, a common configuration to matingly engage with the drive gear of the drive shaft. The driven gears are located with the majority of their extent above the motor 38 and power shaft and are positioned with their axes at laterally spaced locations from a plane containing the axis of the drive shaft. Each gear is in driving engagement with the drive gear for counter rotation with respect to each other when the motor 38 is energized.

Extending axially outwardly from the free ends of the driven shafts are a pair of supplemental shafts 68 and 70. Such shafts are rotatable through the rotation of the driven gear and drive shaft. In the preferred embodiments, the supplemental shafts 68 and 70 are simply extensions of the driven shafts 54 and 56. The supplemental shafts 68 and 70 have free ends within the exterior housing 30 adjacent to apertures 72 and 74 which are formed in the exterior housing 30. The supplemental shafts 68 and 70 have free ends 76 for the receipt of bits as will be described. The free ends 76 of the supplemental shafts 72 and 74 are located just within the apertures 72 and 74 of the exterior housing 30 to preclude accidental injury by inadvertent contact with such free ends.

The last component of the system is an inside deburring bit 82 and an outside deburring bit 84. Such bits are of conventional construction. They include an operating exterior surface and a coupling surface. Such interior coupling surfaces allows the bits to be located through the apertures in the exterior housing 30 for being releasably mounted on one or the other of the supplemental shafts 72 and 74. When coupled therewith, the deburring tool will counter rotate with the activation of the motor 38. One last feature is the use of a on/off switch 88 on the exterior of the housing for activating and inactivating the motor 38 to rotate the bits when desired.

The present invention is an electric powered deburring tool which removes the burrs from the inside and outside of a rifle or pistol cartridge after it has been trimmed to the proper length. It works by putting the case mouth on each of the deburring tools.

It is a motor-driven tool with right angle drives at the head similar to a mixer which holds the deburring tools. The plastic case and the base are to be made with the provision to screw to a bench or sit upright on its base.

The production model of this tool would have the tool, base and housing molded in one part inside of attached to as in the figures with no ejector but with an on/off electrical switch mounted on top.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An apparatus for deburring a cartridge inside and outside comprising, in combination:

a base plate having an upper surface and a lower surface adapted to be positioned on a work surface;

an upstanding interior housing secured to the upper surface of the base plate interiorly at its edges to define therewithin an interior chamber;

an upstanding exterior housing secured to the upper surface of the base plate adjacent to its edges to define an exterior chamber with the interior housing therewithin;

a motor located within the interior chamber with a power generating, horizontally disposed drive shaft extending therefrom to within the exterior chamber for rotation upon energization of the motor;

a drive gear mounted on one end of the drive shaft and rotatable on a horizontal axis and having external drive teeth on the periphery thereof;

a pair of driven shafts mounted about parallel, horizontal axes at a common height above the motor and drive shaft and rotatably secured adjacent to their ends to the interior housing;

a driven gear mounted on each driven shaft at a common elevation within the exterior housing above the motor and power shaft at laterally spaced locations, each driven gear being in direct driving engagement with the drive gear for counter rotating with respect to the drive gear and for rotating in a common direction with respect to each other;

a pair of supplemental shafts rotatable through the rotation of the driven gears and driven shafts for rotation upon the energization of the motor, the supplemental shafts having free ends adjacent to apertures in the exterior housing and providing external surfaces for receipt of bits;

an inside deburring bit removably mounted on one supplemental shaft and an outside deburring bit removably mounted on the other supplemental shaft for rotation for deburring the inside and outside of cartridges, all of the rotatable components being located within the exterior housing except for the deburring bits when in use.

* * * * *